United States Patent
Roylance et al.

(10) Patent No.: US 10,063,530 B1
(45) Date of Patent: *Aug. 28, 2018

(54) VOICE-OVER-INTERNET PROTOCOL CREDENTIALS

(71) Applicant: Sorenson IP Holdings, LLC, Salt Lake City, UT (US)

(72) Inventors: Shane Roylance, Farmington, UT (US); Merle Lamar Walker, III, Sandy, UT (US); Ryan Jones, West Jordan, UT (US); Michael Sorokine, Bountiful, UT (US); David Kam, Salt Lake City, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,185

(22) Filed: Mar. 2, 2017

Related U.S. Application Data

(63) Continuation of application No. 15/184,589, filed on Jun. 16, 2016, now Pat. No. 9,614,973.

(51) Int. Cl.
H04L 29/00 (2006.01)
H04L 29/06 (2006.01)
(Continued)

(52) U.S. Cl.
CPC .......... *H04L 63/062* (2013.01); *H04L 63/068* (2013.01); *H04L 63/08* (2013.01);
(Continued)

(58) Field of Classification Search
CPC .................................................. H04M 7/0078
See application file for complete search history.

(56) References Cited

U.S. PATENT DOCUMENTS

| | | | |
|---|---|---|---|
| 4,777,469 A | 10/1988 | Engelke et al. | |
| 4,959,847 A | 9/1990 | Engelke et al. | |

(Continued)

FOREIGN PATENT DOCUMENTS

| | | |
|---|---|---|
| WO | 2014/155030 A1 | 10/2014 |
| WO | 2015/130941 A1 | 9/2015 |

OTHER PUBLICATIONS

BackTrack-Linux, "Presenting VOIP" http://www.backtrack-linux.org/wiki/index.php/Pentesting_VOIP, retrieved on May 11, 2016.

*Primary Examiner* — Madhuri R Herzog
(74) *Attorney, Agent, or Firm* — Maschoff Brennan

(57) ABSTRACT

A computer-implemented method to provide voice-over-internet protocol (VoIP) credentials to a device may include receiving, at a system, first credentials from a device. The method may also include authenticating the device using the first credentials and after authenticating the device, obtaining, at the system, a device identifier for the device based on the first credentials. The method may further include establishing a connection between the system and a VoIP system configured to provide VoIP services and after establishing the connection, providing, from the system, the device identifier to the VoIP system. The method may also include receiving, at the system, VoIP credentials for the device. In some embodiments, the VoIP credentials may be configured to authenticate the device with the VoIP system such that the device is able to receive the VoIP services from the VoIP system. The method may further include providing the VoIP credentials to the device.

20 Claims, 6 Drawing Sheets

(51) Int. Cl.
*H04M 7/00* (2006.01)
*H04L 9/32* (2006.01)

(52) U.S. Cl.
CPC ...... *H04L 63/0876* (2013.01); *H04M 7/0066* (2013.01); *H04M 7/0078* (2013.01); *H04L 9/32* (2013.01)

(56) References Cited

U.S. PATENT DOCUMENTS

| | | | |
|---|---|---|---|
| 5,081,673 A | 6/1992 | Engelke et al. | |
| 5,325,417 A | 6/1994 | Engelke et al. | |
| 5,327,479 A | 7/1994 | Engelke et al. | |
| 5,351,288 A | 9/1994 | Engelke et al. | |
| 5,432,837 A | 7/1995 | Engelke et al. | |
| D364,865 S | 12/1995 | Engelke et al. | |
| 5,581,593 A | 12/1996 | Engelke et al. | |
| 5,604,786 A | 2/1997 | Engelke et al. | |
| 5,687,222 A | 11/1997 | McLaughlin et al. | |
| 5,724,405 A | 3/1998 | Engelke et al. | |
| 5,809,425 A | 9/1998 | Colwell et al. | |
| 5,909,482 A | 6/1999 | Engelke | |
| 5,974,116 A | 10/1999 | Engelke et al. | |
| 5,978,654 A | 11/1999 | Colwell et al. | |
| 6,075,842 A | 6/2000 | Engelke et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,594,346 B2 | 7/2003 | Engelke | |
| 6,603,835 B2 | 8/2003 | Engelke et al. | |
| 6,882,707 B2 | 4/2005 | Engelke et al. | |
| 6,885,731 B2 | 4/2005 | Engelke et al. | |
| 7,512,967 B2 | 3/2009 | Sentoff | |
| 7,660,398 B2 | 2/2010 | Engelke et al. | |
| 7,881,441 B2 | 2/2011 | Engelke et al. | |
| 8,001,379 B2 | 8/2011 | Daskalopoulos et al. | |
| 8,089,943 B2 | 1/2012 | Lim | |
| 8,139,564 B1 | 3/2012 | Weaver et al. | |
| 8,369,834 B2 | 2/2013 | Rozensztejn et al. | |
| 8,605,876 B2 | 12/2013 | Smith et al. | |
| 8,842,660 B2 | 9/2014 | Milstein et al. | |
| 8,843,999 B1 * | 9/2014 | Vasquez | H04L 65/1006 726/28 |
| 9,066,227 B2 | 6/2015 | Spencer et al. | |
| 9,350,857 B1 | 5/2016 | Engelke et al. | |
| 9,521,210 B2 * | 12/2016 | Taylor | H04L 63/08 |
| 2008/0084870 A1 | 4/2008 | Taylor et al. | |
| 2009/0196285 A1 | 8/2009 | Smires et al. | |
| 2013/0007122 A1 | 1/2013 | Su | |
| 2013/0138570 A1 | 5/2013 | Ross | |
| 2013/0269020 A1 | 10/2013 | Griffin et al. | |
| 2014/0335822 A1 | 11/2014 | Jain | |
| 2014/0376705 A1 | 12/2014 | Layman et al. | |
| 2015/0188882 A1 | 7/2015 | Wang et al. | |
| 2016/0057290 A1 | 2/2016 | Punwani et al. | |

\* cited by examiner

VOICE-OVER-INTERNET PROTOCOL CREDENTIALS

CROSS-REFERENCE TO RELATED APPLICATIONS

This patent application is a continuation of U.S. patent application Ser. No. 15/184,589, filed Jun. 16, 2016, which is incorporated herein by reference.

FIELD

The embodiments discussed herein are related to obtaining Voice-Over-Internet Protocol (VoIP) credentials.

BACKGROUND

Traditional circuit-switched voice service is being gradually replaced by packet-based IP network technology such as Voice-Over-Internet Protocol (VoIP). Common uses of VoIP may include fixed residential services provided via a cable modem or mobile device services. Today, the installation and/or provisioning of VoIP devices may be costly, complex, and/or multi-phased. For example, in some instances a technician may be required to perform onsite installation. Additionally, manually relaying of information, such as relaying customer information to a VoIP system and relaying customer credentials to customers may occur.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to provide Voice-Over-Internet Protocol (VoIP) credentials to a device may include receiving, at a system, first credentials from a device. The method may also include authenticating the device using the first credentials and after authenticating the device, obtaining, at the system, a device identifier for the device based on the first credentials. The method may further include establishing a connection between the system and a VoIP system configured to provide VoIP services and after establishing the connection, providing, from the system, the device identifier to the VoIP system. The method may also include receiving, at the system, VoIP credentials for the device. In some embodiments, the VoIP credentials may be configured to authenticate the device with the VoIP system such that the device is able to receive the VoIP services from the VoIP system. The method may further include providing the VoIP credentials to the device.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to a system that may be configured to obtain Voice-Over-Internet Protocol (VoIP) credentials for a device from a VoIP system. In these and other embodiments, the system may create a VoIP account for the device with the VoIP system, obtain the VoIP credentials from the VoIP system, and provide the VoIP credentials to the device. The device may use the VoIP credentials to access VoIP services from the VoIP system.

For example, in some embodiments, a device may register with a system that is not the VoIP system. After registration, the device may log-in to the system to obtain the VoIP credentials. In these and other embodiments, the system may authenticate the device. After device authentication, the system may register the device with the VoIP system using information from the log-in or the device registration. For example, the system may establish a secure connection with the VoIP system and provide information about the device to the VoIP system. The information may include an address associated with the device, a device identifier, among other information.

The VoIP system may assign a phone number to the device based on a physical address associated with a user of the device and may generate VoIP credentials for the device. The VoIP system may provide the phone number and the VoIP credentials to the system. The system may relay the phone number and the VoIP credentials to the device. The device may provide the VoIP credentials to the VoIP system to obtain the VoIP system's VoIP services without further communication with the system.

The system and method described in this disclosure may provide various benefits. For example, the system and methods may increase a speed of obtaining VoIP credentials as well as maintaining the security of the VoIP credentials. The system and methods may decrease errors associated with a device receiving VoIP services. Furthermore, the disclosure may also provide meaningful limitations in one or more particular technical environments that go beyond an abstract idea. For example, embodiments of the disclosure may provide improvements in the technical field of telecommunications, particularly in a telecommunication system including VoIP communication services. Embodiments include features that may improve the functionality of devices and systems such that a new device, system, and method for obtaining VoIP credentials is described.

Figure 1:
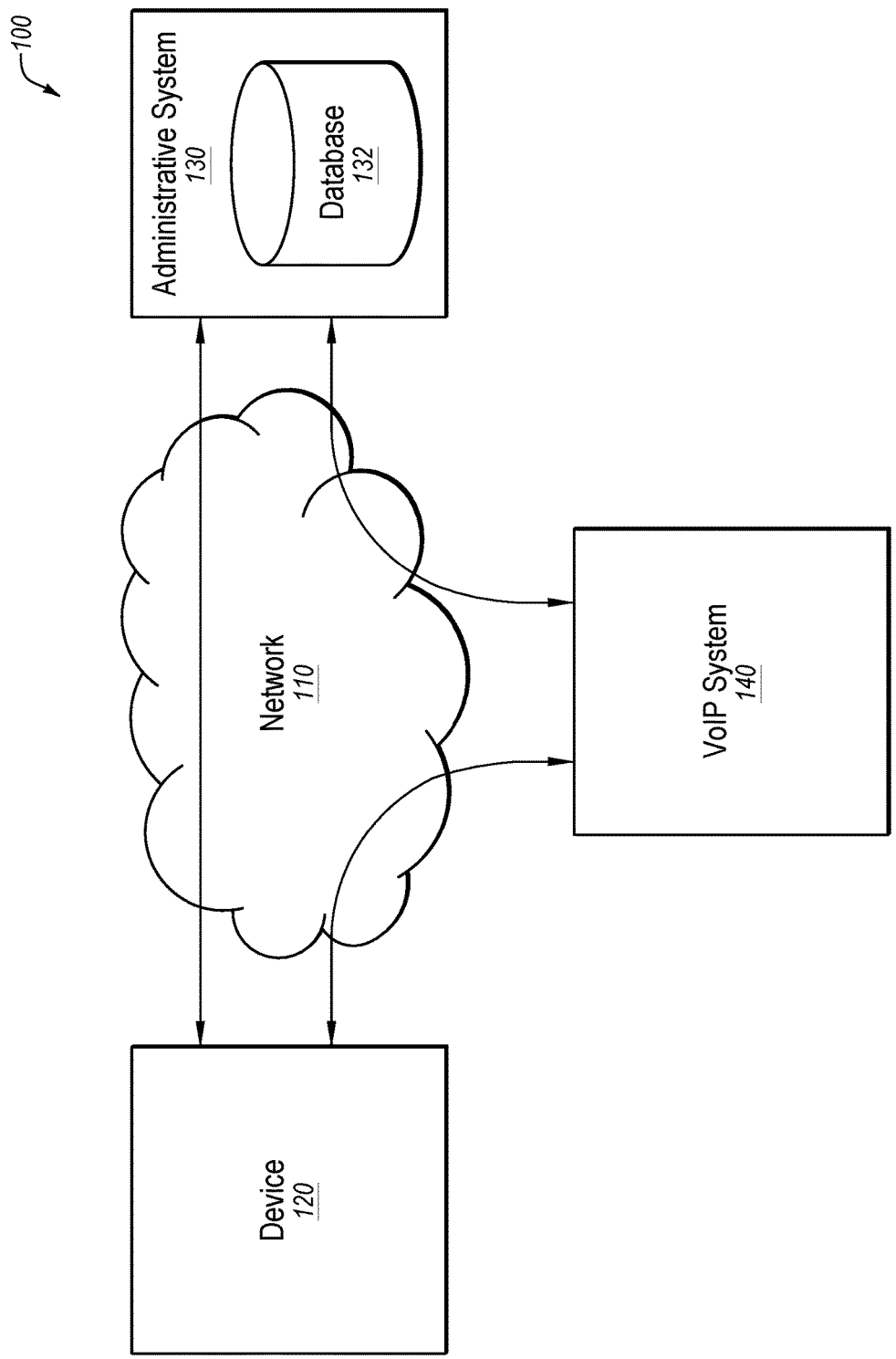
FIG. 1 illustrates an example system configured to obtain voice-over-internet protocol (VoIP) credentials for a device.

Turning to the figures, FIG. 1 illustrates an example system 100 configured to obtain Voice-Over-Internet Protocol (VoIP) credentials for a device. The system 100 may be arranged in accordance with at least one embodiment described in the present disclosure. The system 100 may include a network 110, a device 120, an administrative system 130 that includes a database 132, and a VoIP system 140.

The network 110 may be configured to communicatively couple the administrative system 130 with the device 120 and the VoIP system 140 and to communicatively couple the device 120 with the VoIP system 140.

In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

The device 120 may be any electronic or digital device. For example, the device 120 may include a desktop computer, a laptop computer, a smartphone, a mobile phone, a tablet computer, a phone console, or any other processing device. In some embodiments, the device 120 may be configured to establish communication sessions with other devices. For example, the device 120 may be configured to establish a VoIP phone call with another device. Alternately or additionally, the device 120 may be configured to communicate with other systems such as the administrative system 130 and the VoIP system 140 over a network, such as the network 110. In these and other embodiments, the device 120 may receive data from and send data to both the administrative system 130 and the VoIP system 140.

In some embodiments, the administrative system 130 may include any configuration of hardware, such as processors, servers, and databases that are networked together and configured to perform a task. For example, the administrative system 130 may include multiple computing systems, such as multiple servers that each include memory and at least one processor, which are networked together and configured to perform operations as described in this disclosure, among other operations. In some embodiments, the administrative system 130 may include computer-readable-instructions that are configured to be executed by the administrative system 130 to perform operations described in this disclosure.

In some embodiments, the VoIP system 140 may include any configuration of hardware, such as processors, servers, and databases that are networked together and configured to perform a task. For example, the VoIP system 140 may include multiple computing systems, such as multiple servers that each include memory and at least one processor, which are networked together and configured to perform operations as described in this disclosure, among other operations. In some embodiments, the VoIP system 140 may include computer-readable-instructions that are configured to be executed by the VoIP system 140 to perform operations described in this disclosure.

In some embodiments, the administrative system 130 may be configured to register the device 120 with the VoIP system 140 and obtain VoIP credentials for the device 120 from the VoIP system 140. In these and other embodiments, the administrative system 130 may also pay for the VoIP services obtained by the device 120 from the VoIP system 140. While the administrative system 130 may register, pay for, and obtain the VoIP credentials on behalf of the device 120, the administrative system 130 may not be involved with administration of the VoIP services to the device 120 by the VoIP system 140. For example, after the device 120 obtains the VoIP credentials from the administrative system 130, the device 120 may obtain VoIP services from the VoIP system 140 without further involvement from the administrative system 130.

In some embodiments, the VoIP system 140 and the administrative system 130 may be separate third-party systems that are separated by firewalls, networks, etc. For example, the VoIP system 140 and the administrative system 130 may be controlled and operated by different entities that are unaffiliated except through the transactions discussed in the present disclosure. In these and other embodiments, the administrative system 130 may be affiliated with the VoIP system 140 to the extent that the administrative system 130 may register and obtain VoIP credentials for the device 120 and other devices that are registered with the administrative system 130. Thus, the administrative system 130 may not be controlled, used by, or otherwise affected by the VoIP system 140 except when the administrative system 130 requests registration and credentials from the VoIP system 140 for devices registered with the administrative system 130.

In some embodiments, the administrative system 130 may also be configured to provide additional services to the device 120. For example, the administrative system 130 may be configured to provide captioning of VoIP communication sessions between the device 120 and other devices. Further details regarding captioning services are provided with respect to FIG. 6.

To register the device 120, the administrative system 130 may receive registration information about the device 120 and/or a user of the device 120. In these and other embodiments, the registration information may include a device identifier, such as an electronic serial number or some other identifier unique to the device 120. The registration information may additionally include a physical address associated with the user of the device 120, information about the user of the device 120, authentication credentials, such as unique authentication identification and password, among other information. Using the registration information, the administrative system 130 may register the device 120 and generate a system identifier for the device 120. The administrative system 130 may store the registration information and the system identifier for the device 120 in the database 132.

In some embodiments, the administrative system 130 may host a website through which the administrative system 130 may obtain the registration information from a device 120. Alternately or additionally, the device 120 may include an application associated with the administrative system 130 through which the administrative system 130 may obtain the registration information.

After registration of the device 120, the device 120 may send the authentication credentials to the administrative system 130. In some embodiments, the administrative system 130 may request the authentication credentials from the device 120 or the device 120 may send the authentication credentials without a request from the administrative system 130.

Using the authentication credentials, the administrative system 130 may authenticate the device 120. The administrative system 130 may also be configured to obtain the system identifier of the device 120 based on the authentication credentials. In these and other embodiments, the administrative system 130 may obtain the system identifier by retrieving the system identifier from the database 132 using the log-in credentials.

The administrative system 130 may also make a determination regarding whether the device 120 is registered with the VoIP system 140. When the device 120 is not registered with the VoIP system 140, the administrative system 130 may be configured to register the device 120 with the VoIP system 140.

To register the device 120 with the VoIP system 140, the administrative system 130 may provide information regarding the device 120 to the VoIP system 140. In some embodiments, the administrative system 130 may provide the device identifier and/or the system identifier to the VoIP system 140 to register the device 120.

The VoIP system 140 may be configured to register the device 120 based on the device identifier and/or the system identifier received from the administrative system 130. Using the device identifier and/or the system identifier, the VoIP system 140 may assign a phone number and a VoIP identifier to the device 120. The VoIP system 140 may also be configured to generate VoIP credentials for the device 120. The VoIP credentials may be used by the device 120 to obtain VoIP services from the VoIP system 140.

In some embodiments, the administrative system 130 may be further configured to provide additional registration information to the VoIP system 140. For example, the administrative system 130 may provide a physical address associated with the device 120 to the VoIP system 140. In these and other embodiments, the physical address may be associated with a home or emergency address location for the device 120. The emergency address location may be location associated with the device 120 that may be accessible by first responders, such as police, fire, or other governmental agencies, when an emergency call is made from the device 120. In some embodiments, the administrative system 130 may obtain confirmation regarding the accuracy of the emergency address location before sending the emergency address location to the VoIP system 140. In these and other embodiments, the administrative system 130 may send the emergency address location to the device 120. The device 120 may present the emergency address location to a user and obtain input from the user regarding the accuracy of the emergency address location. The device 120 may provide the user response as a confirmation to the administrative system 130. In some embodiments, the emergency address location may be changed by the device 120 and submitted to the administrative system 130 for submission to the VoIP system 140.

The VoIP system 140 may receive the additional information from the administrative system 130. In some embodiments, the VoIP system 140 may use the additional information to select the phone number to assign to the device 120. In these and other embodiments, the VoIP system 140 may use the additional information to select a phone number that is associated with the region that includes the physical address associated with the device 120 from the additional information. For example, the VoIP system 140 may select an area code and/or other digits, such as the first three digits of the non-area code portion, of the phone number based on the physical address associated with the device 120. The VoIP system 140 may be further configured to associate the phone number assigned to the device 120 with the emergency address location for use by first responders.

After assignment of the phone number and the generation of the VoIP credentials, the VoIP system 140 may provide the phone number and the VoIP credentials to the administrative system 130. The administrative system 130 may relay the phone number and the VoIP credentials to the device 120. The administrative system 130 may not store the VoIP credentials after relaying the phone number and the VoIP credentials to the device 120. For example, the administrative system 130 may temporarily store the VoIP credentials to allow the administrative system 130 to connect and forward the VoIP credentials to the device 120. However, after providing the VoIP credentials to the device 120, the VoIP credentials may not be stored in the administrative system 130. In this manner, the administrative system 130 may be a pass-through system for the VoIP credentials.

The device 120 may receive the phone number and the VoIP credentials from the administrative system 130. In some embodiments, the administrative system 130 may also provide a network address of the VoIP system 140. In these and other embodiments, the device 120 may provide the VoIP credentials to the VoIP system 140 to the network address of the VoIP system 140 independent of the administrative system 130.

The VoIP system 140 may receive the VoIP credentials and may authenticate the device 120. After authentication, the VoIP system 140 may authorize communication sessions using VoIP services from the VoIP system 140. As a result, the device 120 may receive and make phone calls and/or establish other communication sessions with other devices using the phone number provided by the VoIP system 140 and the VoIP services from the VoIP system 140. In these and other embodiments, the administrative system 130 may not be involved in establishing and/or maintaining the communication sessions using the VoIP services from the VoIP system 140. The administrative system 130 may provide ancillary services, such as transcription services of the communication sessions, but such services may not affect the VoIP services and/or the VoIP system 140 may not change how the VoIP services are provided to the device 120 as compared to devices that do not use the administrative system 130 to register with the VoIP system 140.

In some embodiments, the VoIP credentials may expire. In these and other embodiments, the device 120 may request renewed VoIP credentials from the administrative system 130. To request the renewed VoIP credentials, the device 120 may provide the authentication credentials to the administrative system 130. The administrative system 130 may authenticate the device 120. After authenticating the device 120, the administrative system 130 may provide information about the device 120, such as the device identifier and/or the system identifier to the VoIP system 140. The VoIP system 140 may provide the renewed VoIP credentials to the administrative system 130. The administrative system 130 may relay the renewed VoIP credentials to the device 120. The device 120 may send the renewed VoIP credentials to the VoIP system 140 to continue to use the VoIP services provided by the VoIP system 140.

Modifications, additions, or omissions may be made to the system 100 without departing from the scope of the present disclosure. For example, in some embodiments, the system 100 may include additional devices similar to the device 120. In these and other embodiments, the administrative system 130 may obtain VoIP credentials for the other devices in a similar manner as the device 120. In some embodiments, the network 110 used to establish communication between the device 120 and the administrative system 130 may be different from the network used for communication between the device 120 and the VoIP system 140 and the network used for communication between the administrative system 130 and the VoIP system 140. The network 110 provides an illustration of an example network that may be used.

Figure 2:
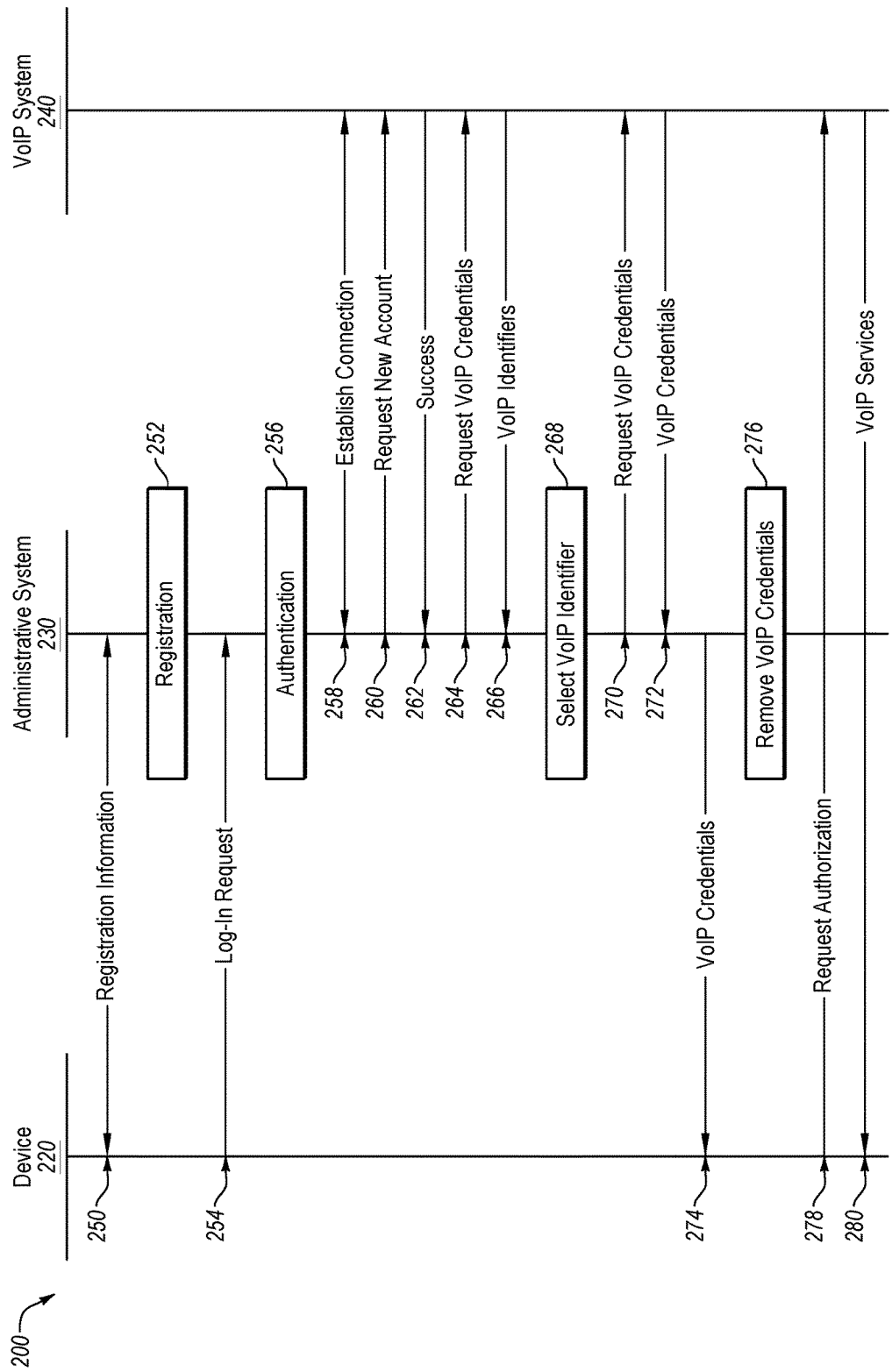
FIG. 2 illustrates example operations in a system configured to obtain VoIP credentials for a device.

FIG. 2 illustrates example operations 200 in a system configured to obtain VoIP credentials for a device. The operations 200 may be arranged in accordance with at least one embodiment described in the present disclosure. The operations 200 may be between a device 220, an administrative system 230, and a VoIP system 240. In some embodiments, the device 220, the administrative system 230, and the VoIP system 240 may be analogous to the device 120, the administrative system 130, and the VoIP system 140, respectively, of FIG. 1. Accordingly, no further explanation is provided with respect thereto. In some embodiments, the operations 200 may be an example of communications and interactions between the device 220, the administrative system 230, and the VoIP system 240 that may occur over one or more networks. The operations 200 illustrated are not exhaustive but are merely representative of operations 200 that may occur. Furthermore, one operation as illustrated may represent one or more communications, operations, and/or data exchanges.

The operations 200 may include an exchange of registration information 250 between the device 220 and the administrative system 230. In these and other embodiments, an application may be running on the device 220 that may perform operations by the device 220 and/or direct the communications between the device 220 and the administrative system 230 and between the device 220 and the VoIP system 240. In these and other embodiments, the application may be a specific application running on the device 220 that may be provided by the administrative system 230.

In these and other embodiments, the registration information 250 may include a device identifier, authentication credentials, an address associated with the device, and other information about the device 220. Using the registration information 250, the administrative system 230 may register 252 the device 220. Registration 252 of the device 220 may include the administrative system 230 generating a system identifier for the device 220. In some embodiments, the administrative system 230 may associate the registration information 250 with the system identifier and may store the registration information 250 and the system identifier. The registration information 250 being associated with the system identifier may indicate that the registration information 250 and the system identifier are stored in a database such that one or both of the registration information 250 and the system identifier point to each other in the database. The stored registration information 250 may be used to authenticate the device 220 in the future and to obtain a system identifier for the device 220 when the device 220 is authenticated. Using the system identifier, other information about the device 220 may be accessed or other operations performed by the administrative system 230 for the device 220.

The device 220 may provide a log-in request 254 to the administrative system 230. The log-in request 254 may include the authentication credentials. Using the authentication credentials, the administrative system 230 may authenticate 256 or log-in the device 220. The administrative system 230 may authenticate 256 the device 220 using any manner of authentication algorithms or schemes. Using the information from authentication 256, the administrative system 230 may obtain the system identifier. The administrative system 230 may obtain the system identifier by retrieving the system identifier from a database.

The administrative system 230 may establish a connection 258 with the VoIP system 240. To establish the connection 258, the administrative system 230 may offer one or more tokens or other authenticating credentials to the VoIP system 240. In some embodiments, the connection may be through an application programming interface API established for communication between the administrative system 230 and the VoIP system 240.

After establishing a connection, the administrative system 230 may issue a new account request 260 for the device 220. When requesting the new account, the administrative system 230 may provide some or all of the registration information to the VoIP system 240. For example, the administrative system 230 may provide the device identifier and/or the system identifier to the VoIP system 240.

The VoIP system 240 may be configured to select and assign a phone number to the device 220 based on the new account request 260. Furthermore, the VoIP system 240 may assign a VoIP identifier to the device 220 that may be associated with the device identifier and/or the system identifier assigned by the administrative system 230. The VoIP system 240 may indicate to the administrative system 230 that the new account has been successfully 262 generated.

After account creation, the administrative system 230 may issue a VoIP credentials request 264 for the device 220. In some embodiments, the VoIP credentials request 264 may include the system identifier for the device 220. Alternately or additionally, the VoIP credentials request 264 may not include an identifier for a specific device, but may be a general request for information regarding devices registered with the VoIP system 240 through the administrative system 230. In some embodiments, the VoIP credentials request 264 may be sent to an API endpoint of the VoIP system 240.

In response to the VoIP credentials request 264, the VoIP system 240 may provide the administrative system 230 with VoIP identifiers 266 associated with the administrative system 230. In these and other embodiments, the VoIP identifiers 266 associated with the administrative system 230 may include VoIP identifiers 266 generated for devices that are registered with the VoIP system 240 by the administrative system 230. The VoIP identifiers 266 may be provided with their corresponding device identifiers. For example, each VoIP identifier 266 may be correlated to a specific device identifier.

The administrative system 230 may be configured to select a VoIP identifier 268 that is associated with the device 220. To select the VoIP identifier 268 associated with the device 220, the administrative system 230 may obtain the device identifier of the device 220. In some embodiments, the device identifier may have been obtained with the registration information and may be stored by the administrative system 230. Alternately or additionally, the device identifier may be provided by the device 220 during the log-in request 254 or during the authentication 256. Alternately or additionally, the administrative system 230 may request the device identifier from the device 220 after authenticating the device 220. The administrative system 230 may search the device identifiers correlated with the VoIP identifiers 266 that are received from the VoIP system 240 for the device identifier of the device 220. In some embodiments, the device identifiers correlated with the VoIP identifiers 266 that are received from the VoIP system 240 may be referred to as correlated device identifiers. By searching the correlated device identifiers, the administrative system 230 may select the correlated device identifier that matches or is otherwise determined to be equivalent to the device identifier of the device 220. The VoIP identifier that is correlated with the selected correlated device identifier may be selected by the administrative system 230. The selected VoIP identifier may be the VoIP identifier assigned by the VoIP system 240 to the device 220 during the generation of the account for the device 220.

The administrative system 230 may again send a VoIP credentials request 270 to the VoIP system 240 along with the selected VoIP identifier. The VoIP system 240 may use the selected VoIP identifier to generate VoIP credentials for the device 220. The VoIP system 240 may provide the VoIP credentials 272 to the administrative system 230. In some embodiments, the VoIP credentials request 270 may be sent to an API endpoint of the VoIP system 240.

The administrative system 230 may provide the VoIP credentials 274 to the device 220. After providing the VoIP credentials to the device 220, the administrative system 230 may remove the VoIP credentials 276 on the administrative system 230. In these and other embodiments, removing the VoIP credentials 276 may not involve any affirmative action by the administrative system 230. In these and other embodiments, the VoIP credentials may be stored in short-term memory after being received from the VoIP system 240 while being provided to the device 220. In these and other embodiments, the VoIP credentials may be removed by being overwritten during normal operations or by the administrative system 230 disassociating the location of the VoIP credentials such that they are no longer stored.

In some embodiments, the administrative system 230 may encrypt the VoIP credentials 274 before sending the VoIP credentials 274 to the device 220. In some embodiments, the application running on the device 220 may receive the VoIP credentials from the administrative system 230. When the VoIP credentials 274 are encrypted, the application on the device 220 may decrypt the VoIP credentials 274. In some embodiments, the keys used to encrypt and decrypt the VoIP credentials 274 may be shared between the device 220 and the administrative system 230, but not the VoIP system 240.

In response to receipt of the VoIP credentials, the application on the device 220 may issue an authorization request 278 to the VoIP system 240. The authorization request 278 may include the VoIP credentials 274 received from the administrative system 230. The VoIP system 240 may authorize the device 220 based on the VoIP credentials 274 and provide the device 220 with VoIP services 280. In some embodiments, the VoIP services 280 may provide the device 220 with the ability to establish communication sessions between the device 220 and other devices using a VoIP connection. For example, the device 220 may be able to make and receive phone calls using a number assigned by the VoIP system 240.

Modifications, additions, or omissions may be made to the operations 200 without departing from the scope of the present disclosure. For example, in some embodiments, the operations 200 may include the VoIP system 240 assigning a phone number to the device 220 based on a geographic location associated with the device 220. Other operations 200 may include providing the phone number to the administrative system 230 and the administrative system 230 relaying the phone number to the device 220. In some embodiments, some of the operations 200 may not be performed. For example, in some embodiments, the log-in request 254 may not occur as the device 220 may be authenticated during the registration 252 of the device 220.

Additionally or alternately, one or more of the operations 200 may occur when the VoIP credentials are no longer valid and are ready for renewal. In these and other embodiments, the registration information 250 and the registration 252 operations may not occur.

Figure 3:
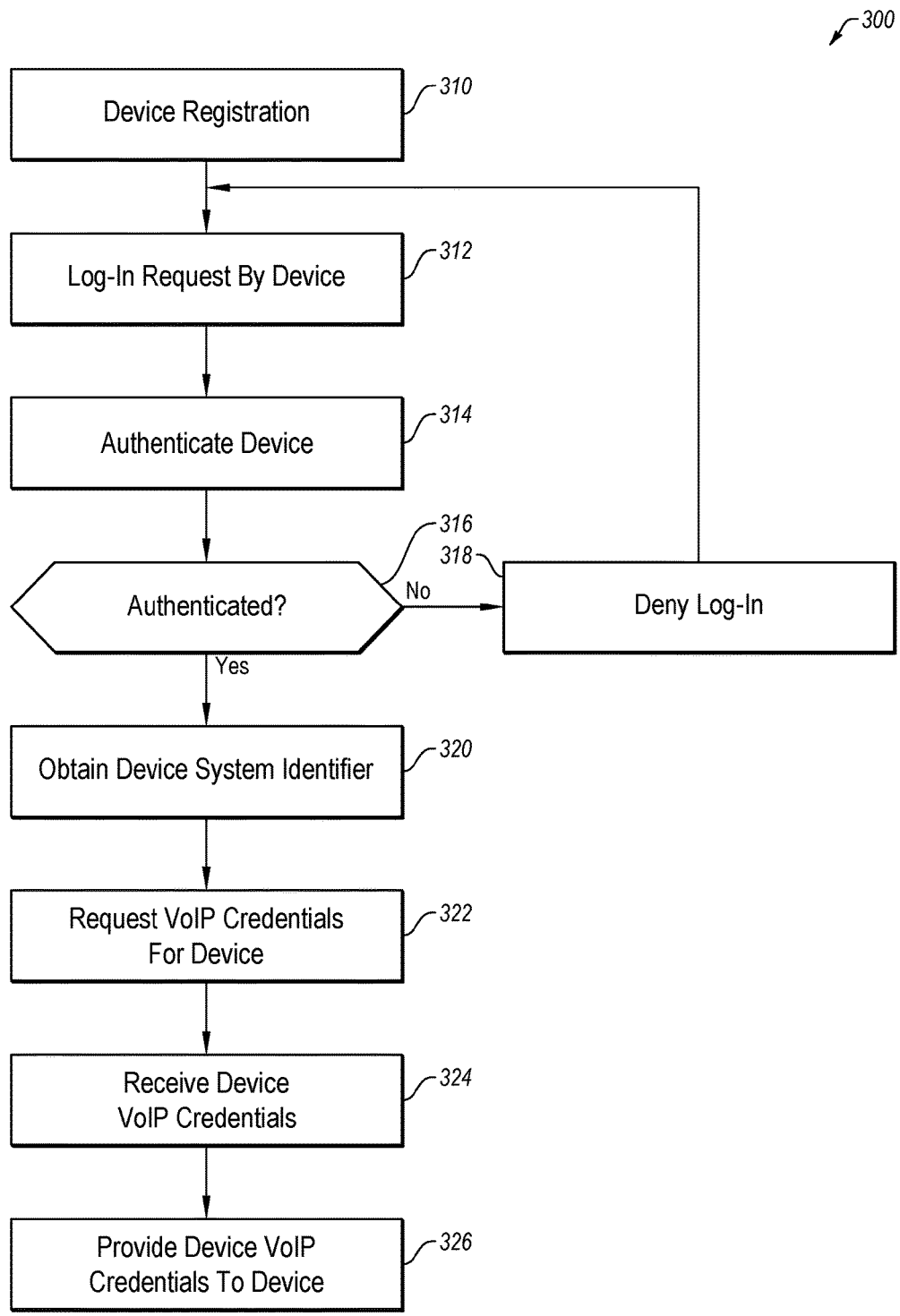
FIG. 3 is a flowchart of an example computer-implemented method to obtain VoIP credentials for a device.

FIG. 3 is a flowchart of an example computer-implemented method 300 to obtain VoIP credentials for a device. The method 300 may be arranged in accordance with at least one embodiment described in the present disclosure. The method 300 may be implemented, in some embodiments, by a system, such as the system 100 and/or the system 500 of FIGS. 1 and 5, respectively. In some embodiments, the method 300 may result from operations performed by a system based on instructions stored in one or more computer-readable media. Although illustrated as discrete blocks, various blocks may be divided into additional blocks, combined into fewer blocks, or eliminated, depending on the desired implementation.

The method 300 may begin at block 310, where a device may be registered with an administrative system. During registration, authentication credentials and a device system identifier may be determined for the device. Furthermore, the device may provide a device identifier to the administrative system.

In block 312, a log-in request from the device may be received at the administrative system. In some embodiments, the log-in request may include authentication credentials of the device.

In some embodiments, the log-in request may be made automatically by an application running on the device without a request from a user of the device. The application may be configured to assist in handling VoIP communications for the device. In these and other embodiments, the application on the device may determine to request a log-in if VoIP credentials stored by the application on the device are no longer valid or are soon to become invalid. Alternately or additionally, the log-in request may be made automatically by the application based on a periodic or random period of time, a number of communication sessions that have occurred, and/or based on other data points that may be tracked by the application.

In block 314, the administrative system may use the authentication credentials from the device to authenticate the device. In block 316, it may be determined if the device is authenticated by the administrative system. When the device is not authenticated, the method 300 may proceed to block 318. When the device is authenticated, the method 300 may proceed to block 320.

In block 318, when the device is not authenticated by the administrative system, the log-in of the device may be denied. In some embodiments, the administrative system may indicate to the device why the authentication failed. In these and other embodiments, the method 300 may not proceed until another log-in request is received from the device.

In block 320, when the device is authenticated by the administrative system, a device system identifier may be obtained. In some embodiments, the device system identifier may be obtained from a database.

In block 322, VoIP credentials for the device may be requested by the administrative system from a VoIP system. In some embodiments, the VoIP credentials may be requested based on the device system identifier.

In block 324, the administrative system may receive the VoIP credentials from the VoIP system. In block 326, the administrative system may provide the VoIP credentials to the device. In some embodiments, the administrative system may encrypt the VoIP credentials before sending the VoIP credentials to the device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may not include block 320. In these and other embodiments, the VoIP credentials may be generically requested for the administrative system or requested using a device identifier, such as a device electronic serial number. Alternately or additionally, the method 300 may not include block 310. Alternately or additionally, the method 300 may include additional blocks. For example, additional operations may be performed between block 322 and 324. FIG. 2 may illustrate some examples of operations that may be performed between blocks 322 and 324.

Figure 4:
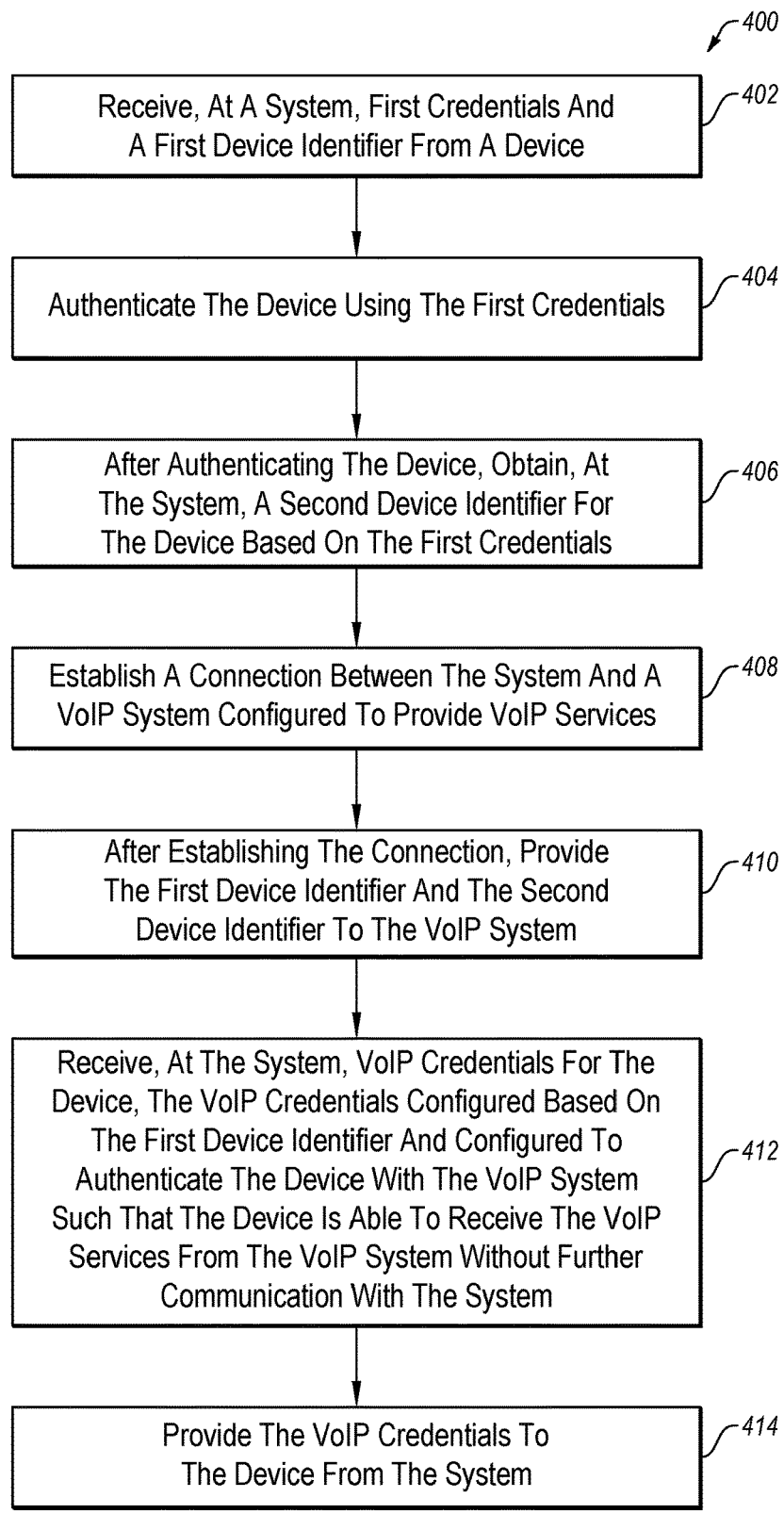
FIG. 4 is a flowchart of another example computer-implemented method to obtain VoIP credentials for a device.

FIG. 4 is a flowchart of another example computer-implemented method 400 to obtain VoIP credentials for a device. The method 400 may be arranged in accordance with at least one embodiment described in the present disclosure. The method 400 may be performed, in some embodiments, by a system, such as the system 100 and/or system 500 of FIGS. 1 and 5, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where first credentials and a first device identifier may be received at a system from a device. In some embodiments, the first device identifier may be an electronic serial number of the device. In block 404, the device may be authenticated using the first credentials.

In block 406, after authenticating the device, a second device identifier for the device that is based on the first credentials may be obtained at the system. In some embodiments, the device identifier is obtained from a database that is part of the system. In these and other embodiments, the device identifier may have been previously received and stored in the database. Alternately or additionally, the device identifier may be obtained from the device.

In block 408, a connection may be established between the system and a VoIP system configured to provide VoIP services. In some embodiments, the connection may include the system connecting with an API of the VoIP system.

In block 410, after establishing the connection, the first device identifier and the second device identifier may be provided to the VoIP system.

In block 412, VoIP credentials for the device may be received at the system. The VoIP credentials may be configured based on the first device identifier and configured to authenticate the device with the VoIP system such that the device is able to receive the VoIP services from the VoIP system without further communication with the system. In some embodiments, the device is able to receive the VoIP services from the VoIP system without further communication with the system until the VoIP credentials expire. In these and other embodiments, after expiration of the VoIP credentials, one or more operations of the method 400 may be repeated to obtain renewed VoIP credentials from the VoIP system.

In block 414, the VoIP credentials may be provided to the device from the system. In some embodiments, VoIP credentials may be encrypted by the system such that the VoIP credentials provided to the device are encrypted. In some embodiments, the VoIP credentials may be passed through the system to the device. In these and other embodiments, the VoIP credentials may not be maintained in the system after providing the VoIP credentials to the device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include receiving multiple device identifiers that include the first device identifier. In these and other embodiments, each of the multiple device identifiers may be associated with a different device that is configured to receive VoIP services. The method 400 may further include receiving multiple VoIP identifiers. In these and other embodiments, each of the multiple VoIP identifiers may correspond to a different one of the multiple device identifiers. In these and other embodiments, the method 400 may further include selecting one of the multiple VoIP identifiers. The one of the multiple VoIP identifiers may correspond to the first device identifier of the multiple device identifiers. In some embodiments, the method 400 may further include providing the one of the multiple VoIP identifiers to the VoIP system. In these and other embodiments, the VoIP credentials for the device are received at the system in response to providing the one of the multiple VoIP identifiers.

In some embodiments, the method 400 may further include receiving, at the system, audio of a communication session between a second device and the device. In these and other embodiments, the communication session may be implemented using the VoIP system. In some embodiments, the method 400 may further include generating text data based on the audio of the communication session and providing the text data to the device. The device may be configured to display the text data and present the audio simultaneously.

Figure 5:
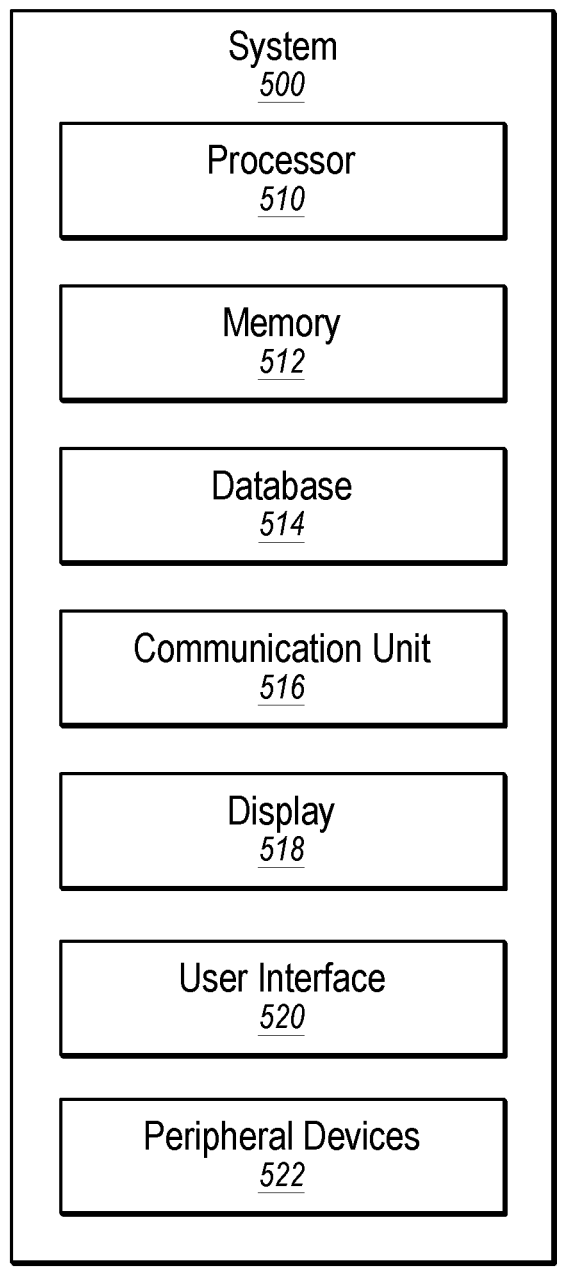
FIG. 5 illustrates an example computing system that may be used in obtaining VoIP credentials for a device.

FIG. 5 illustrates an example computing system 500 that may be used in obtaining VoIP credentials for a device. The system 500 may be arranged in accordance with at least one embodiment described in the present disclosure. The system 500 may include a processor 510, a memory 512, a database 514, a communication unit 516, a display 518, a user interface unit 520, and a peripheral device 522, which all may be communicatively coupled. In some embodiments, the system 500 may be part of any of the system or devices described in this disclosure. For example, the system 500 may be part of the device 120 or the administrative system 130 of FIG. 1.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512, the database 514, or the memory 512 and the database 514. In some embodiments, the processor 510 may fetch program instructions from the database 514 and load the program instructions into the memory 512.

After the program instructions are loaded into the memory 512, the processor 510 may execute the program instructions. For example, the system 500 may be part of the device 120 of FIG. 1. In these and other embodiments, the instructions may include the processor 510 instructing the communication unit 516 to transmit registration information to the administrative system 130 or to transmit the VoIP credentials to the VoIP system 140.

As another example, the system 500 may be part of the administrative system 130 of FIG. 1. In these and other embodiments, the instructions may include the processor 510 fetching authentication credentials from the database 514 to authenticate the device 120 among other operations that may be performed by the administrative system 130 of FIG. 1.

The memory 512 and the database 514 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations, such as one or more of the operations 200, one or more blocks of the method 300, and/or one or more blocks of the method 400.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 516 may permit data to be exchanged with a network and/or any other devices or systems described in the present disclosure. For example, if the system 500 is included in the administrative system 130 of FIG. 1, the communication unit 516 may allow the administrative system 130 to communicate with the VoIP system 140 over the network 110 of FIG. 1.

The display 518 may be configured as one or more displays, like an LCD, LED, or other type display. The display 518 may be configured to present video, text captions, user interfaces, and other data as directed by the processor 510.

The user interface unit 520 may include any device to allow a user to interface with the system 500. For example, the user interface unit 520 may include a mouse, a track pad, a keyboard, and/or a touchscreen, among other devices. The user interface unit 520 may receive input from a user and provide the input to the processor 510.

The peripheral devices 522 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 500 or otherwise generated by the system 500.

Modifications, additions, or omissions may be made to the system 500 without departing from the scope of the present disclosure. For example, when the system 500 is part of the administrative system 130 of FIG. 1, the system 500 may not include one or more of the display 518, the peripheral devices 522, or other aspects of the system 500.

Figure 6:
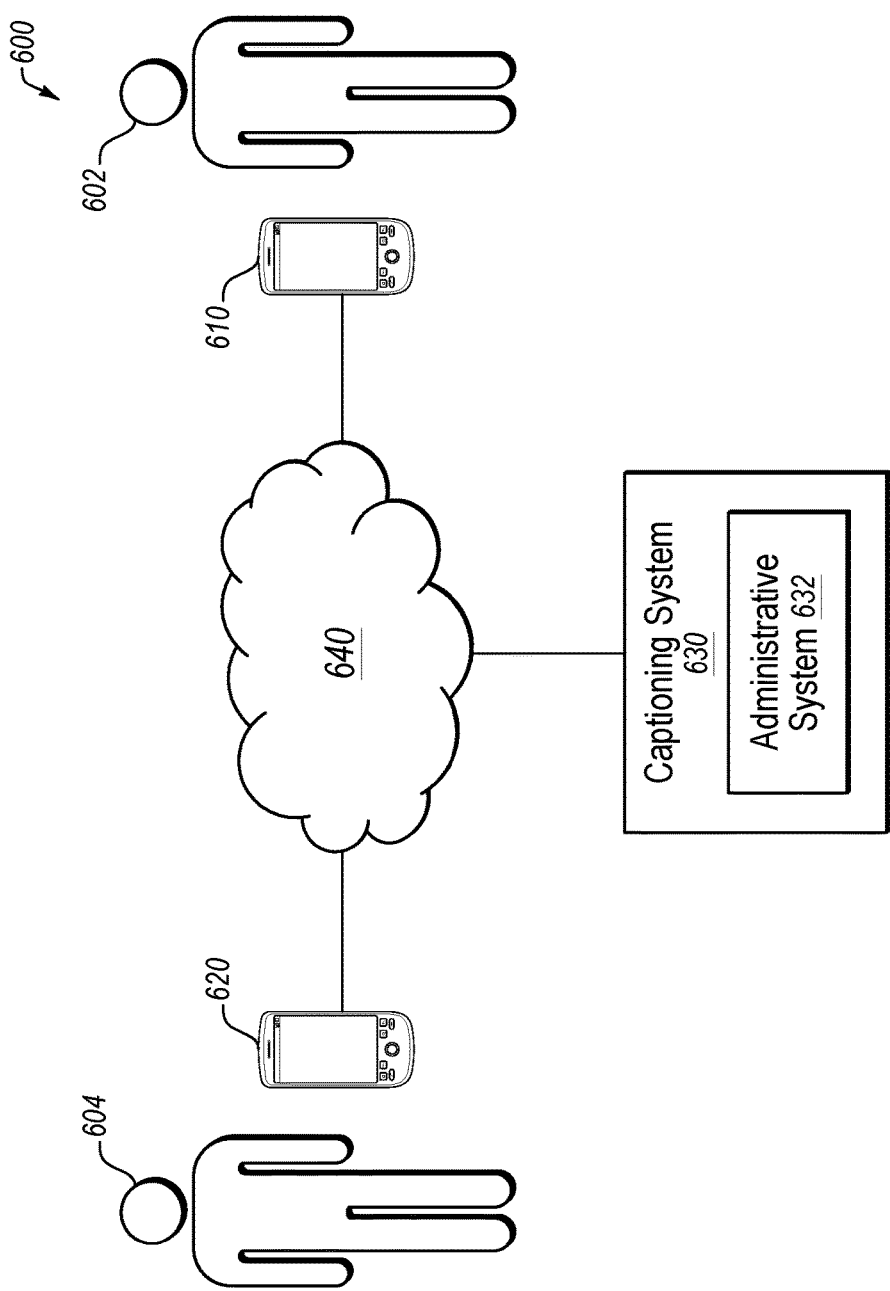
FIG. 6 illustrates an example communication system that may include an administrative system configured to obtain VoIP credentials for a device.

FIG. 6 illustrates an example communication system 600 that may include an administrative system configured to obtain VoIP credentials for a device. The communication system 600 may be arranged in accordance with at least one embodiment described in the present disclosure. The communication system 600 may include a first device 610, a second device 620, and a captioning system 630 that includes an administrative system 632. The first device 610 and the captioning system 630 may be communicatively coupled by the network 640. Alternately or additionally, the first device 610 and the second device 620 may be communicatively coupled by the network 640.

As illustrated, the first device 610 and the administrative system 632 may be analogous and include the functionality of the device 120 and the administrative system 130, respectively, of FIG. 1. FIG. 6 illustrates an example of the additional services that the administrative system 632 may provide to the first device 610. The network 640 may be analogous to the network 110 and no further description is provided with respect to FIG. 6.

In some embodiments, the communication system 600 illustrated may be configured to facilitate an assisted call between a hearing-impaired user 602 and a second user 604. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, a communication session may be established between the first device 610 and the second device 620. In these and other embodiments, the communication session may be established using VoIP services. The first device 610 may obtain access to use the VoIP services using VoIP credentials obtained from the administrative system 632 as explained in the present disclosure.

The captioning system 630 may be an assistive service, which is intended to permit a hearing-impaired person to utilize a communication network and assist their understanding of a conversation by providing text captions to supplement voice conversation occurring during communication sessions with other devices, such as the second device 620.

During a captioning communication session, the captioning system 630 and the first device 610 maybe be communicatively coupled using networking protocols. In some embodiments, during the communication session between the first device 610 and the second device 620, the first device 610 may provide the audio signal from the second device 620 to the captioning system 630.

At the captioning system 630, a call assistant may listen to the audio signal of the second user 604 and "revoice" the words of the second user 604 to a speech recognition computer program tuned to the voice of the call assistant. In these and other embodiments, the call assistant may be an operator who serves as a human intermediary between the hearing-impaired user 602 and the second user 604. In some embodiments, text captions may be generated by the speech recognition computer as a transcription of the audio signal of the second user 604. The text captions may be provided to the first device 610 being used by the hearing-impaired user 602 over the network 640. The first device 610 may display the text captions while the hearing-impaired user 602 carries on a normal conversation with the second user 604. The text captions may allow the hearing-impaired user 602 to supplement the voice signal received from the second device 620 and confirm his or her understanding of the words spoken by the second user 604.

Modifications, additions, or omissions may be made to the communication system 600 without departing from the scope of the present disclosure. For example, in some embodiments, the second user 604 may be hearing impaired. In these and other embodiments, the captioning system 630 may provide text captions to the second device 620 based on audio data transmitted by the first device 610. Alternately or additionally, the captioning system 630 may include additional functionality. For example, the captioning system 630 may edit the text captions or make other alterations to the text captions after presentation of the text captions on the first device 610.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 512 or database 514 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order. Generally, the terms "first," "second," "third," etc., are used to distinguish between different elements as generic identifiers. Absence a showing that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to obtain Voice-Over-Internet Protocol (VoIP) credentials, the method comprising:
    obtaining, at a system, a device identifier of a device;
    establishing a connection between the system and a VoIP system configured to provide VoIP services;
    after establishing the connection, providing the device identifier to the VoIP system;
    receiving, at the system, VoIP credentials for the device, the VoIP credentials configured based on the device identifier and configured to authenticate the device with the VoIP system such that the device is able to receive the VoIP services from the VoIP system without further communication with the system; and
    providing the VoIP credentials to the device from the system, wherein the VoIP credentials are passed through the system to the device and not maintained in the system after the system provides the VoIP credentials to the device.

2. The method of claim 1, wherein the device identifier is an electronic serial number of the device.

3. The method of claim 1, wherein the device is able to receive the VoIP services from the VoIP system without further communication with the system until the VoIP credentials expire.

4. The method of claim 3, wherein after the VoIP credentials expire the method further comprises:
    reestablishing the connection between the system and the VoIP system;
    providing, from the system, a request for renewed VoIP credentials to the VoIP system;
    receiving, at the system, the renewed VoIP credentials for the device; and
    providing the renewed VoIP credentials to the device from the system, wherein the renewed VoIP credentials are passed through the system to the device and not maintained in the system after the system provides the renewed VoIP credentials to the device.

5. The method of claim 1, wherein after providing the device identifier to the VoIP system, the method further comprises:
    receiving, from the VoIP system at the system, a plurality of VoIP identifiers, each of the plurality of VoIP identifiers corresponding to a different one of a plurality of devices that include the device;
    selecting, by the system, one of the plurality of VoIP identifiers, the selected one of the plurality of VoIP identifiers corresponding to the device; and
    providing the selected one of the plurality of VoIP identifiers to the VoIP system, wherein the VoIP credentials for the device are received at the system in response to providing the selected one of the plurality of VoIP identifiers.

6. The method of claim 5, wherein providing the device identifier to the VoIP system is part of creating an account for the device with the VoIP system, and wherein before receiving the plurality of VoIP identifiers the method further comprises:
    obtaining, from the VoIP system, an indication of completion of the account for the device with the VoIP system; and
    providing, to the VoIP system from the system, a request for the plurality of the VoIP identifiers.

7. At least one non-transitory computer readable media configured to store one or more instructions that in response to being executed by at least one computing system cause the at least one computing system to direct or perform the method of claim 1.

8. A computer-implemented method to provide Voice-Over-Internet Protocol (VoIP) credentials, the method comprising:
    obtaining, at a system, a device identifier of a device;
    providing, from the system, the device identifier to a VoIP system configured to provide VoIP services;
    receiving, at the system, VoIP credentials for the device, the VoIP credentials configured based on the device identifier and configured to authenticate the device with the VoIP system such that the device is able to receive the VoIP services from the VoIP system; and
    providing the VoIP credentials to the device from the system, wherein the VoIP credentials are passed through the system to the device and not maintained in the system after the system provides the VoIP credentials to the device.

9. The method of claim 8, wherein the device identifier is obtained from a database that is part of the system.

10. The method of claim 8, wherein the device identifier is obtained from the device.

11. The method of claim 8, wherein the device is able to receive the VoIP services from the VoIP system without further communication with the system until the VoIP credentials expire.

12. The method of claim 11, wherein after the VoIP credentials expire the method further comprises:
    providing, from the system, a request for renewed VoIP credentials to the VoIP system;
    receiving, at the system, the renewed VoIP credentials for the device; and
    providing the renewed VoIP credentials to the device from the system, wherein the renewed VoIP credentials are passed through the system to the device and not maintained in the system after the system provides the renewed VoIP credentials to the device.

13. The method of claim 8, further comprising before receiving the VoIP credentials for the device, providing, from the system, a request for the VoIP credentials to the VoIP system.

14. The method of claim 13, wherein providing the device identifier to the VoIP system is part of creating an account for the device with the VoIP system and wherein before providing the request for the VoIP credentials to the VoIP system, the method further comprises obtaining, from the VoIP system, an indication of completion of the account for the device with the VoIP system.

15. The method of claim 13, further comprising before providing the request for the VoIP credentials to the VoIP system, providing, from the system, a request for VoIP identifiers to the VoIP system.

16. The method of claim 15, wherein in response to providing the request for VoIP identifiers, the method further comprises:

receiving a plurality of VoIP identifiers, each of the plurality of VoIP identifiers corresponding to a different one of a plurality of devices that include the device;

selecting, by the system, one of the plurality of VoIP identifiers, the selected one of the plurality of VoIP identifiers corresponding to the device; and providing, from the system, the selected one of the plurality of VoIP identifiers to the VoIP system, wherein the VoIP credentials for the device are received at the system in response to providing the selected one of the plurality of VoIP identifiers.

17. The method of claim 8, further comprising:

receiving, at the system, audio of a communication session between a second device and the device, the communication session implemented using the VoIP system;

generating text data based on the audio of the communication session; and providing the text data to the device, the device configured to present the text data and the audio simultaneously.

18. At least one non-transitory computer readable media configured to store one or more instructions that in response to being when executed by at least one computing system cause the at least one computing system to direct or perform the method of claim 8.

19. A system comprising:

at least one non-transitory computer readable media configured to store one or more instructions; and at least one processor coupled to the at least one non-transitory computer readable media and configured to execute the one or more instructions, the at least one processor configured to direct or perform operations in response to the execution of the one or more instructions, the operations comprising:

obtain, at the system, a device identifier of a device;

provide, from the system, the device identifier to a VoIP system configured to provide VoIP services;

receive, at the system, VoIP credentials for the device, the VoIP credentials configured based on the device identifier and configured to authenticate the device with the VoIP system such that the device is able to receive the VoIP services from the VoIP system; and provide the VoIP credentials to the device from the system, wherein the VoIP credentials are passed through the system to the device and not maintained in the system after the system provides the VoIP credentials to the device.

20. The system of claim 19, wherein the operations further comprise:

receive, from the VoIP system at the system, a plurality of VoIP identifiers, each of the plurality of VoIP identifiers corresponding to a different one of a plurality of devices that include the device;

select, by the system, one of the plurality of VoIP identifiers, the selected one of the plurality of VoIP identifiers corresponding to the device; and provide the selected one of the plurality of VoIP identifiers to the VoIP system, wherein the VoIP credentials for the device are received at the system in response to providing the selected one of the plurality of VoIP identifiers.

* * * * *